United States Patent
Nitzpon

(10) Patent No.: US 8,172,535 B2
(45) Date of Patent: May 8, 2012

(54) WIND ENERGY PLANT WITH A ROTOR

(75) Inventor: Joachim Nitzpon, Hamburg (DE)

(73) Assignee: Nordex Energy GmbH, Norderstedt (DE)

( * ) Notice: Subject to any disclaimer, the term of this patent is extended or adjusted under 35 U.S.C. 154(b) by 1205 days.

(21) Appl. No.: 11/747,718

(22) Filed: May 11, 2007

(65) Prior Publication Data

US 2007/0290509 A1 Dec. 20, 2007

(30) Foreign Application Priority Data

Jun. 14, 2006 (DE) .......................... 10 2006 027 543

(51) Int. Cl.
*F03D 11/04* (2006.01)
*F03D 11/02* (2006.01)

(52) U.S. Cl. ................ 416/170 R; 416/174; 416/244 R; 416/DIG. 6; 475/331; 475/346; 475/347

(58) Field of Classification Search ............... 415/122.1, 415/124.1, 213.1, 229; 416/170 R, 174, 416/244 R, 244 A, DIG. 6; 290/1 C; 475/331, 475/346, 347
See application file for complete search history.

(56) References Cited

U.S. PATENT DOCUMENTS

| | | | |
|---|---|---|---|
| 6,371,730 B1 | 4/2002 | Wobben | |
| 6,585,620 B1 * | 7/2003 | Bae | ............................. 475/331 |
| 7,614,976 B2 * | 11/2009 | Smook et al. | ................. 475/331 |
| 7,644,482 B2 * | 1/2010 | Albers et al. | ................... 475/331 |
| 2003/0125158 A1 * | 7/2003 | Flamang | ........................ 475/331 |
| 2006/0104815 A1 * | 5/2006 | Siegfriedsen | ............. 416/170 R |
| 2006/0153675 A1 * | 7/2006 | Rogall et al. | ............... 415/170.1 |
| 2010/0074753 A1 * | 3/2010 | Berger et al. | ............. 416/170 R |

FOREIGN PATENT DOCUMENTS

| | | |
|---|---|---|
| CN | 1682033 | 10/2005 |
| DE | 102 31 948 A1 | 1/2004 |
| DE | 102 42 707 B3 | 4/2004 |
| EP | 1 431 575 A2 | 11/2003 |
| EP | 1 457 673 A1 | 3/2004 |
| EP | 1 617 075 A1 | 7/2004 |
| EP | 1 855 001 A1 | 4/2007 |
| UK | 2 395 529 A | 9/2009 |
| WO | 03/031811 A2 | 4/2003 |
| WO | 2004/013516 A1 | 2/2004 |
| WO | 2004/027260 A1 | 4/2004 |
| WO | 2004/046582 A2 | 6/2004 |
| WO | 2007/085644 A1 | 8/2007 |

* cited by examiner

*Primary Examiner* — Christopher Verdier

(74) *Attorney, Agent, or Firm* — Vidas, Arrett & Steinkraus

(57) ABSTRACT

A wind energy plant with a rotor, which is coupled to a gear via a rotor shaft, the rotor shaft being double bearing mounted via one rotor side bearing and one gear side bearing, wherein a connection between the rotor shaft and gear is provided at the gear side of the gear side bearing, and the gear side bearing props up on a machine carrier via at least one supporting equipment and the gear is detachably connected with the supporting equipment.

12 Claims, 4 Drawing Sheets

WIND ENERGY PLANT WITH A ROTOR

CROSS-REFERENCE TO RELATED APPLICATIONS

Not applicable.

STATEMENT REGARDING FEDERALLY SPONSORED RESEARCH

Not applicable

BACKGROUND OF THE INVENTION

The present invention is related to a wind energy plant with a rotor which is coupled with an input shaft of a gear via a rotor shaft. The rotor shaft is double bearing mounted via one rotor side bearing and one gear side bearing. The gear has a gear housing.

Erich Hau, Windkraftanlagen, 3th edition, Springer-Verlag 2003 resumes the three-point bearing of a rotor shaft and gear in greater wind energy plants as follows: a rotor shaft and gear are supported by three points in this configuration, one front bearing and two lateral gear pedestals. The advantage of the three-point bearing is a shortening of the rotor shaft, and through this also of the load-supporting structure of the machine house. In addition, the assembly group "rotor shaft with bearing and gear" can be pre-assembled and combinedly built in, through which an efficient assembly of the machine house is facilitated. Also, it may be fallen back on standard gears of conventional construction as far as possible.

Erich Hau points out further that as a further going step towards a more compact construction, the bearing of the rotor immediately on or in the gear is known in the state of the art. When integrating the rotor bearing into the gear, it is intended that the inevitable deformations of the load-supporting housing and the bending of the rotor shaft do not impair the gear function. The supporting bottom platform of the machine house can be significantly made smaller in this concept; small plants can even completely omit a supporting bottom platform.

WO 2004/046582 A2, the entire contents of which is incorporated herein by reference, is related to the realisation of a gear into which is integrated a main bearing for the rotor shaft.

DE 102 31 948 A1, the entire contents of which is incorporated herein by reference, is related to the bearing arrangement for a wind energy plant, in which the bearing has a first bearing ring, connected to the machine housing, and a second bearing ring connected with the rotor hub, which is turnably held on the first bearing ring.

From WO 2004/013516 A1, the entire contents of which is incorporated herein by reference, a planetary gear train for a wind energy plant is known, in which the main bearing of the rotor hub takes place on a bearing disposed outside on the planetary wheel carrier From DE 102 42 707, the entire contents of which is incorporated herein by reference, a bearing for a wind energy plant is known, in which the generator is realised as a circle, concentrically enveloping the gear. In this, the front rotor bearing is shaped as a moment bearing, directly arranged on the hub.

From WO 03 031811, the entire contents of which is incorporated herein by reference, a gear unit with integrated rotor bearing is known. The connection between the gear unit and its link to the housing as well as to the rotor hub permit dismounting of the completely assembled gear unit from the housing and the rotor hub by a drawing movement. The rotor shaft is bearing mounted on the gear side as well as on the rotor side in this. A detachable coupling is provided between the gear side bearing and gear.

The present invention is based on the objective of providing an improved bearing for the rotor shaft of the wind energy plant, in which dismounting the gear can take place simply, without any additional measures for supporting the rotor shaft, and the rotor itself.

BRIEF SUMMARY OF THE INVENTION

The present invention is related to a wind energy plant with a rotor, which is coupled via a rotor shaft to a gear, an arm of a first planetary step of the gear in particular, the rotor shaft being altogether double bearing mounted via one rotor side bearing and one gear side bearing. The gear has a gear housing. The connection between the rotor shaft and the gear takes place at the gear side of the gear side bearing. The gear side bearing props up on a machine carrier via at least one supporting equipment. The gear is connected with the supporting equipment by its gear housing. In the bearing according to the present invention, the rotor shaft is not supported in the gear at its gear side, but there is a separate bearing through the at least one supporting equipment. The gear side bearing props up on the machine carrier via a supporting equipment. At the same time, the gear housing is supported on the supporting equipment, through which a torque support takes place. The particular advantage is that there is no more shaft-hub connection between the bearing positions, i.e. between the gear side and the rotor side bearing. When there is a damage of the gear or other maintenance works at the driving line, it is only necessary to remove the gear housing from the supporting equipments, in order to separate the gear housing with the toothing parts of the gear from the drive line by doing so.

In one preferred embodiment, the supporting equipment has elastic elements, via which the supporting equipment is connected with the machine carrier. Through the elastic elements, supporting equipment and machine carrier are uncoupled.

Preferably, the gear housing is detachably connected with the supporting equipment, by screws for instance, so that the gear can be detached from the supporting equipment without great expenditure.

For simple separation of gear and rotor shaft, the rotor shaft is provided with a torsion disc at the gear side, which transmits the torque from the rotor to the gear. In an advantageous embodiment, the torsion disc is provided a tooth coupling, through which the torque is transmitted to the arm of the first planetary step of the gear. Conveniently, the arm is supported on the torsion disc via an elastic element. A particular advantage of the tooth coupling as well as of the support of the arm on the torsion disc is that by pulling in the axial direction, a separation can take place here.

In one preferred embodiment, the arm is guided through a bearing at the generator side. The expression "at the generator side" refers to an arrangement, in which the torque from the rotor flows via the rotor shaft into the gear, and from there into the generator, so that "generator side" means the output shaft of the gear.

FIG. 5 shows a possible realisation of the decoupling element of the supporting equipment. The example shown in FIG. 5 for the prop-up of the gear housing 100 on an arm of the machine support 102 takes place via a conical bearing with horizontal axis 104. The radial forces from the torque, the transverse forces and the axial forces are received via elastic elements 106.

In one preferred embodiment, the rotor side bearing is realised as a movable bearing and the supporting equipment is formed for the reception of the axial forces. In an alternative embodiment, the rotor side bearing is realised as a fixed bearing, the supporting equipment being formed as to be axially freely movable via elastic elements in doing so.

In an alternative embodiment, the gear has a hollow shaft and a separately realised arm of the first planetary step. In this, the hollow shaft has preferably a tooth coupling at the generator side, which transmits the torque to the arm of the first planetary step of the gear without any bending momentum.

BRIEF DESCRIPTION OF THE SEVERAL VIEWS OF THE DRAWINGS

In the following, the present invention is explained in more detail by means of two examples of its realisation.

DETAILED DESCRIPTION OF THE INVENTION

Figure 1:
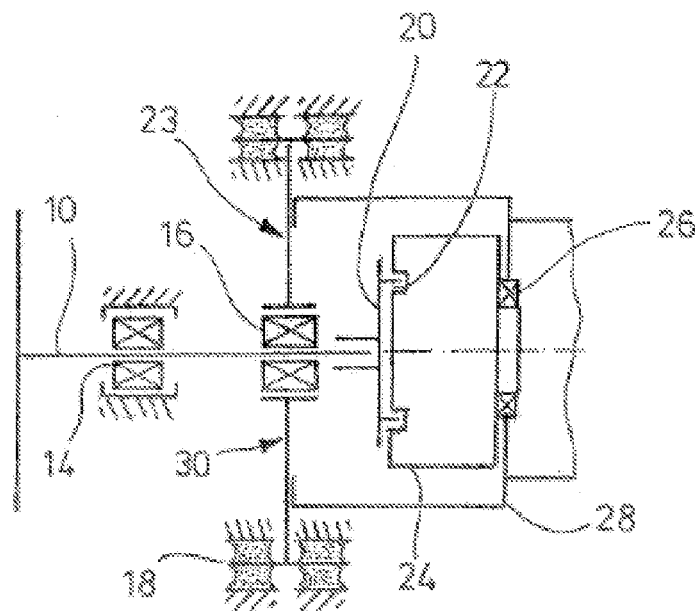
FIG. 1 shows a principle sketch of the bearing according to the present invention.

While this invention may be embodied in many different forms, there are described in detail herein a specific preferred embodiment of the invention. This description is an exemplification of the principles of the invention and is not intended to limit the invention to the particular embodiment illustrated FIG. 1 shows in a schematic view a rotor shaft 10, which is formed with a flange for connection with the rotor at the rotor side. The rotor shaft 10 is bearing mounted at the rotor side with a first bearing 14, and a second bearing 16 at the gear side. The second bearing 16 is linked to the machine carrier of the wind energy plant via a supporting equipment 23. The second bearing 16 is formed such that the supporting equipment 23 is aligned rectangular to the rotor shaft 10 even under load and/or deformation of the rotor shaft 10. The supporting equipment 23 is provided with elastic elements 18, in order not to generate any additional forces for the bearing 16 when the rotor shaft is loaded and/or deformed. In the shown example, the bearing 14 is realised as a fixed bearing, so that the supporting equipment 23 does not have to receive any axial forces.

At the gear side, the shaft 10 is connected to a torsion disc 20, which co-operates via a tooth coupling 22 with an arm 24 of the first step of the planet carrier. The arm 24 is bearing mounted in a gear housing 28 via an arm bearing 26. On its turn, the gear housing 28 is connected to the supporting equipment 23 in the region 30.

In order to dismount the gear, the connection 30 between gear housing and supporting equipment 23 is detached and the gear housing 28 is pulled off from the rotor shaft 10 in the axial direction. Via the tooth coupling 22, the gear can be dismounted and mounted again without further expenditure. In FIG. 1, the tooth coupling 22 is realised as a possible coupling for the transmission of the torque from the shaft 10 to the planetary step 24. Further couplings, which can transmit the torque of the rotor shaft 10 and are removable in the axial direction at the same time, are also possible. Among others, the particular advantage of the tooth coupling is that small radial and axial deformations are not transmitted due to its construction, and therefore a transmission of bending momentums from the rotor bearing to the gear can be avoided.

Figure 3:
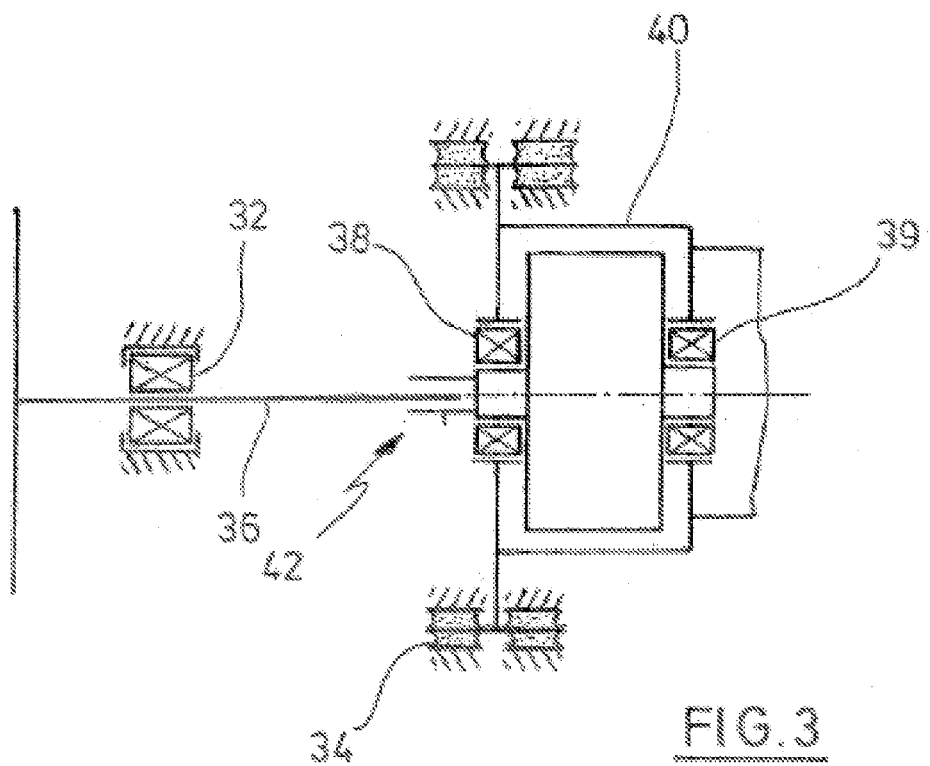
FIGS. 3 and 4 show the essential construction of a three point and a four point bearing of the state of the art.
Figure 4:
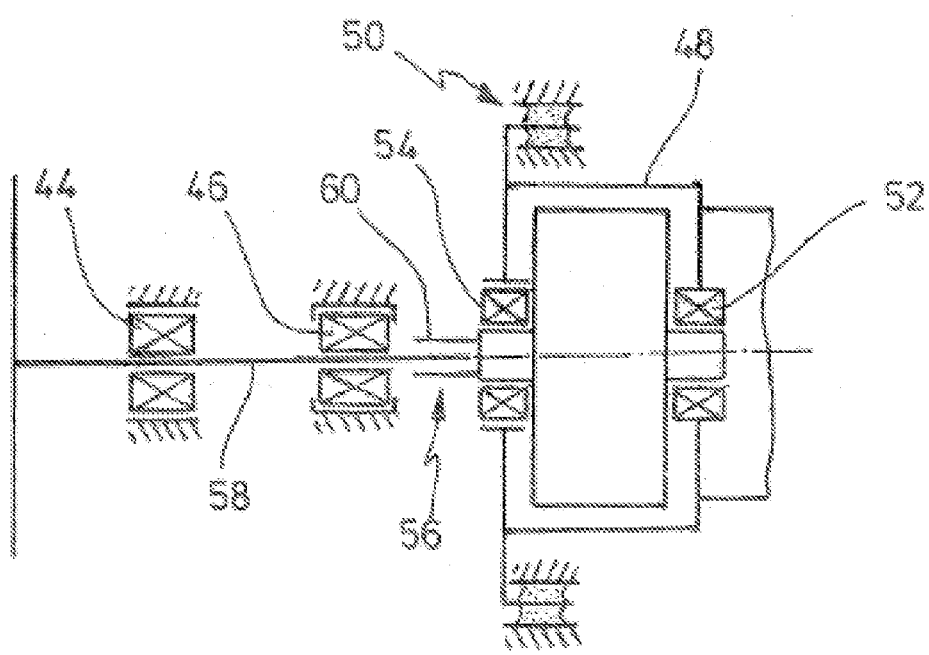

Comparison with the schematic views of FIGS. 3 and 4 clarifies the essential differences of the bearing according to the present invention. FIG. 3 shows a conventional three point bearing with a rotor side bearing 32 and a torque support 34. In contrast to the realisation according to the present invention, the second bearing unit 38, 39 for the shaft 36 is integrated into the gear 40, so that supporting the rotor shaft 36 has to be performed when the connection shaft-hub 42 is detached.

FIG. 4 shows a further, already known realisation of the bearing of a shaft, which is also described as a foul point bearing. At the rotor side, the shaft is bearing mounted by a movable bearing 44 and at the gear side by a fixed bearing 46. The gear housing 48 is connected to the machine carrier via decoupling elements 50. The first step of the planetary gear train is bearing mounted via one bearing 52, 54 at a time at the rotor side and at the generator side. The decoupling elements, also consisting of elastic elements, reduce the additional forces which result on the bearings 52, 54 through the deformations of the rotor shaft 58 and the machine carrier. The particular advantage of the four point bearing is that after detaching the connection 56 between rotor shaft 58 and hollow shaft 60, it is not necessary to support the rotor shaft at removed gear 48, and no bending momentums worth to be mentioned are guided into the gear via the decoupling elements. In this bearing method, it is a disadvantage that the arrangement is relatively long in its construction and makes four roller bearings of great dimensions necessary.

In the bearing shown in FIG. 1, the advantages of the three point bearing are combined with the advantages of the four point bearing.

Figure 2:
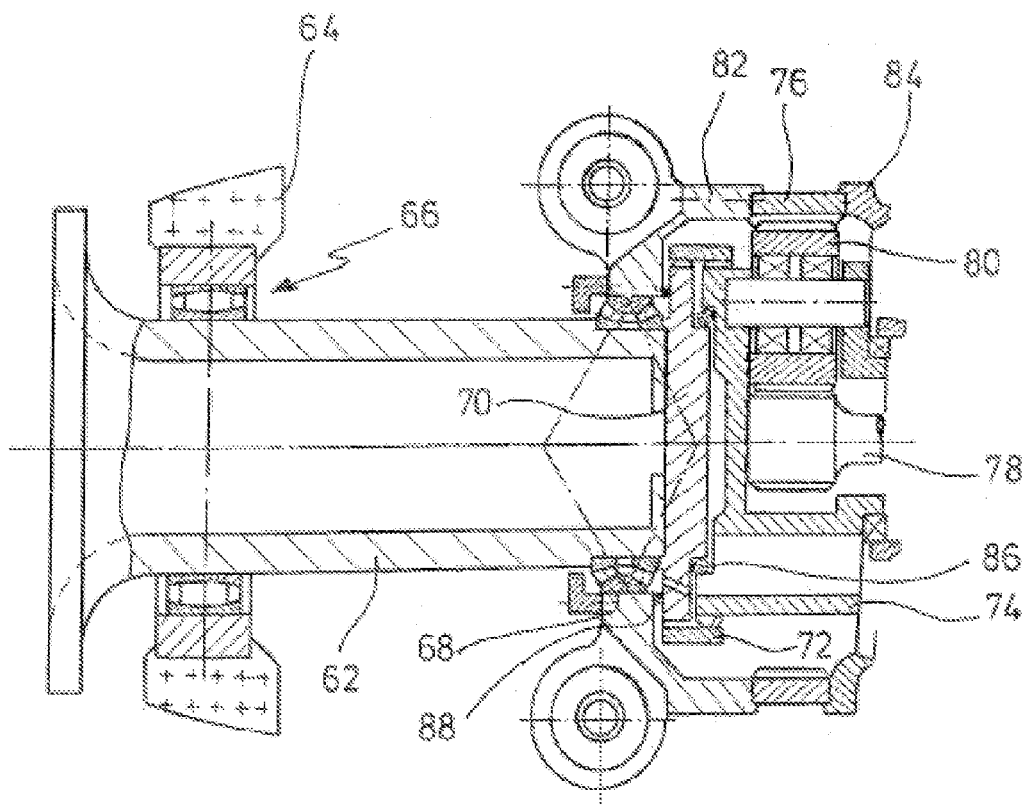
FIG. 2 shows a preferred embodiment of the bearing according to the present invention.

FIG. 2 shows an embodiment of the bearing according to the present invention in a sectional view.

FIG. 2 shows a one-piece shaft 62, which is connected with a machine carrier 64 at the rotor side via a roller bearing, a CARB-bearing 66 for instance. At the gear side, the shaft 62 is bearing mounted via two bearings 68. The bearings are realised as taper roller bearings, which are adjusted to be without clearance or almost without clearance with respect to each other. The pair of bearings 68 may be also realised as a moment bearing. A torsion disc 70 is connected with the shaft 62. The torsion disc 70 has a tooth coupling 72 on its exterior, which engages with the arm 74 of the planetary gear train.

The sun 78 of the planetary gear train as well as the hollow wheel 76 of the first planetary step with a corresponding planet 80 are schematically represented in FIG. 2. The hollow wheel 76 of the first planetary step is held between the gear housing 84 and the supporting equipment 82. The supporting equipment 82 holds the already mentioned gear side bearings 68 for the rotor shaft 62. The arm 74 of the planetary gear train is supported by elastic elements 86 on the torsion disc 70 of the shaft 62.

In order to avoid that soiled oil or other soil reaches the bearing 68 when the gear is damaged, a sealing 88 between the supporting equipment 82 and the torsion disc is 70 provided in addition.

Figure 5:
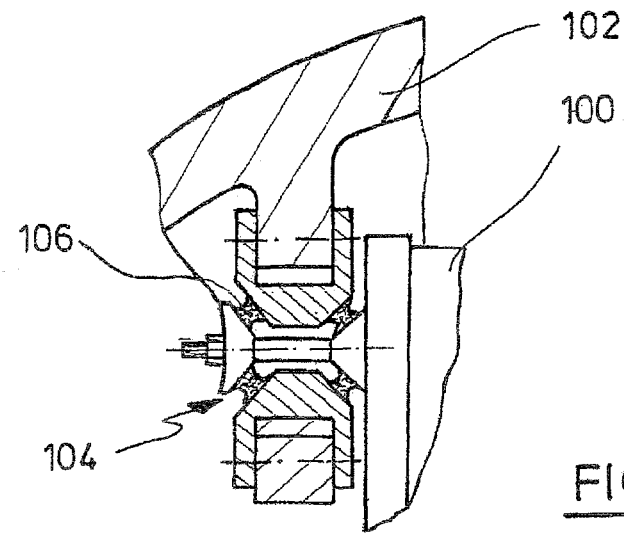
FIG. 5 shows an example for a decoupling element, which serves for linking the gear housing on the machine carrier.

FIG. 5 shows a possible realisation of the decoupling element of the supporting equipment. The example shown in FIG. 5 for the prop-up of the gear housing 100 on a arm of the machine support 102 takes place via a conical bearing with horizontal axis 104. The radial forces from the torque, the transverse forces and the axial forces are received via elastic elements 106.

Figure 6:
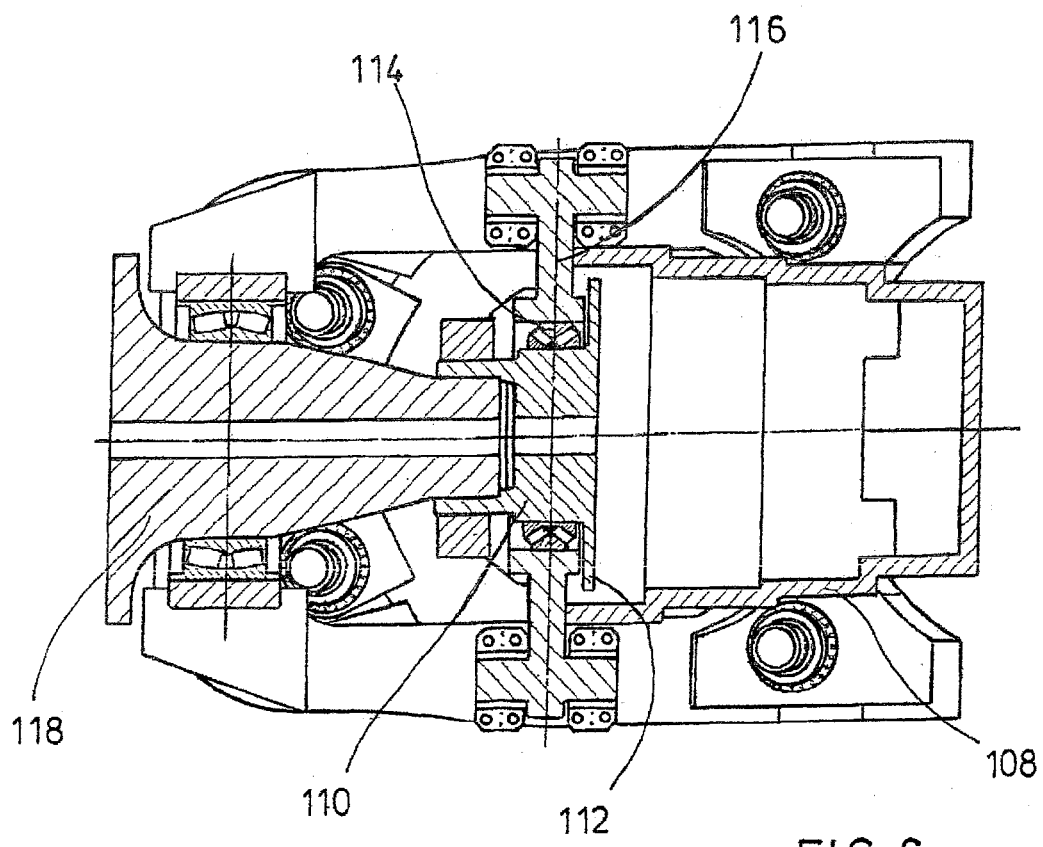
FIG. 6 shows a second embodiment of the bearing according to the present invention, wherein the rotor shaft is realised in two parts.

FIG. 6 shows an alternative embodiment of the bearing according to the present invention in a schematic topside view. In this embodiment, the gear 108 is provided with a hollow shaft 110 at the input side. Hollow shaft 110 and arm (not shown) of the first planetary step are realised separately. The torque is transmitted without bending moments to the arm by a tooth coupling, for instance. The bearing of the hollow shaft 110 with integrated torsion disc 112 takes place through an adjusted pair of taper roller bearings or a moment bearing 114. At the front side, the gear 108 is provided with a torque support 116. The torque support 116 has decoupling elements at the sides thereof, through which the torque support 116 props up on the machine carrier (compare FIG. 7). Hollow shaft 110 and shaft portion 118 do not have to be separated from each other in order to dismount the gear housing 108.

In the present invention, the three point bearing is modified such that no more shaft-hub connection exists between the bearing locations of the rotor shaft, or that it has not to be detached in order to dismount the gear in the case that it is provided. When the rotor shaft is realised in one piece, the fixed bearing and the movable bearing perform the rotor bearing. In this, the fixed bearing can be disposed at the rotor side as well as in the gear. The gear is realised such that the gear housing is supported with toothing parts on the supporting equipment. The gear housing is screwed together with the supporting equipment, the connection being realised as a mounting joint in this, for instance. The bearing in the supporting equipment is realised as a moment bearing or as an adjusted pair of bevel bearings in O-arrangement. A torsion disc is fixed on the rotor shaft at the gear side for mounting the bearings, which transmits the torque to the arm of the first planetary step via a tooth coupling. No bending moments are transmitted together in doing so. The arm is supported on the torsion disc via an elastic element, and further, it is axially and radially guided through a bearing at the generator side. The torsion disc is either screwed and pinned or only screwed with the shaft at the front side, or it is frictionally engaged connected with the shaft via a shrink connection. Other shaft-hub connections are possible, via a tooth coupling integrated directly into the shaft, for instance. When the bearing at the rotor side is realised as a fixed bearing, the gear support is axially freely movable. On the contrary, when the bearing at the rotor side is realised as a movable bearing (Carb-bearing or pendulum roller bearing with axially movable outer ring), the gear support has to receive the axial forces.

Figure 7:
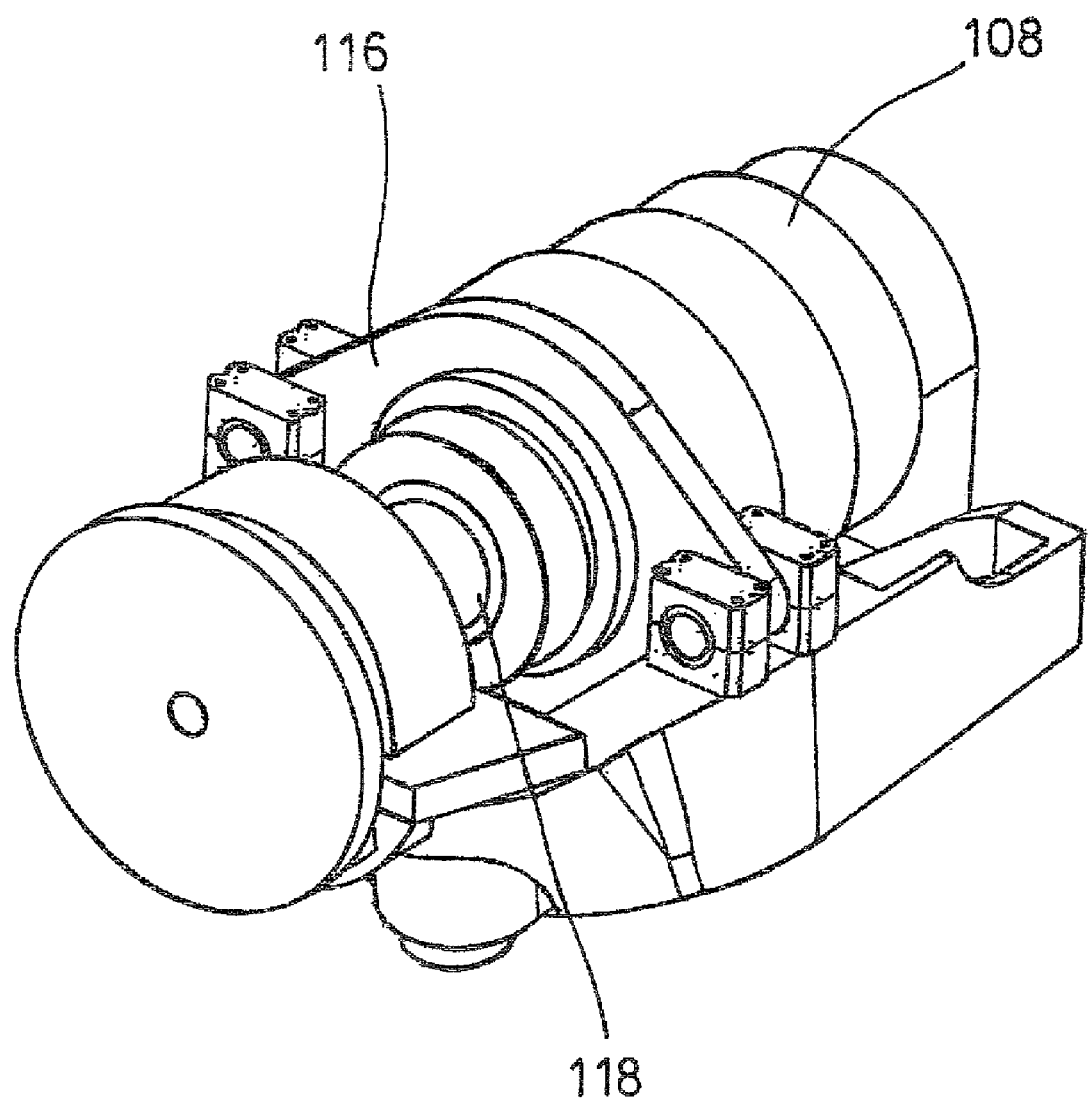
FIG. 7 shows a perspective view of the embodiment of FIG. 6.

In the embodiment according to FIGS. 6 and 7, the rotor shaft is not formed in one piece, but has a first portion 118, which is bearing mounted at the rotor side. A second portion 110 of the rotor shaft is realised as a hollow shaft. Again, the torque is transmitted from the hollow shaft to the arm (not shown) via a tooth coupling without bending moments. The bearing of the hollow shaft with integrated torsion disc 112 is realised at one side, by an adjusted pair of taper roller bearings 114 or by a moment bearing. The gear can be separated and dismounted by detaching the gear housing 108 from the front side torque support 116. Only when the shaft-hub connection between first shaft portion 118 and the hollow shaft 110 is detached, dismounting of the rotor and/or supporting the rotor is necessary.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A wind energy plant with a rotor, which is coupled to a gear via a rotor shaft, the gear having a gear housing and a planetary gear train comprising a pinion cage, the rotor shaft being double bearing mounted via one rotor side bearing and one gear side bearing,
    wherein a connection between the rotor shaft and the pinion cage is provided at the gear side of the gear side bearing, such that the rotor shaft is not supported in the gear;
    the gear side bearing props up on a machine carrier via at least one supporting equipment;
    the gear housing is detachably connected with the supporting equipment; and
    the rotor shaft has a torsion disc at the gear side of the gear side bearing, which transmits the torque from the rotor to the planetary gear train.

2. A wind energy plant according to claim 1, characterised in that the supporting equipment connects the machine carrier with the gear side bearing via elastic elements.

3. A wind energy plant according to claim 1, characterised in that the torsion disc has a tooth coupling which transmits the torque to an arm of a first planetary step of the gear.

4. A wind energy plant according to claim 3, characterised in that the arm is supported on the torsion disc via an elastic element.

5. A wind energy plant according to claim 3, characterised in that the arm is guided through a bearing at a generator side.

6. A wind energy plant according to claim 1, characterised in that the torsion disc is screwed and/or pinned with the rotor shaft at the front side thereof.

7. A wind energy plant according to claim 1, characterised in that the torsion disc is connected to the rotor shaft via a shrink connection.

8. A wind energy plant according to claim 1, characterised in that the rotor shaft and torsion disc each at a time have an axial toothing.

9. A wind energy plant according to claim 1, characterised in that the rotor side bearing is realized as a movable bearing and the supporting equipment is formed for the reception of axial forces.

10. A wind energy plant according to claim 1, characterised in that the rotor side bearing is realized as a fixed bearing and the supporting equipments are formed as to be axially freely movable.

11. A wind energy plant according to claim 1, characterised in that the gear has a hollow shaft and a separately realized arm of a first planetary step.

12. A wind energy plant according to claim 11, characterised in that the hollow shaft has a tooth coupling at a generator side, which transmits the torque to the arm of the first planetary step of the gear.

* * * * *